Aug. 7, 1928.
L. SCUSA
1,679,501
INDICATOR GAUGE
Filed Sept. 29, 1927
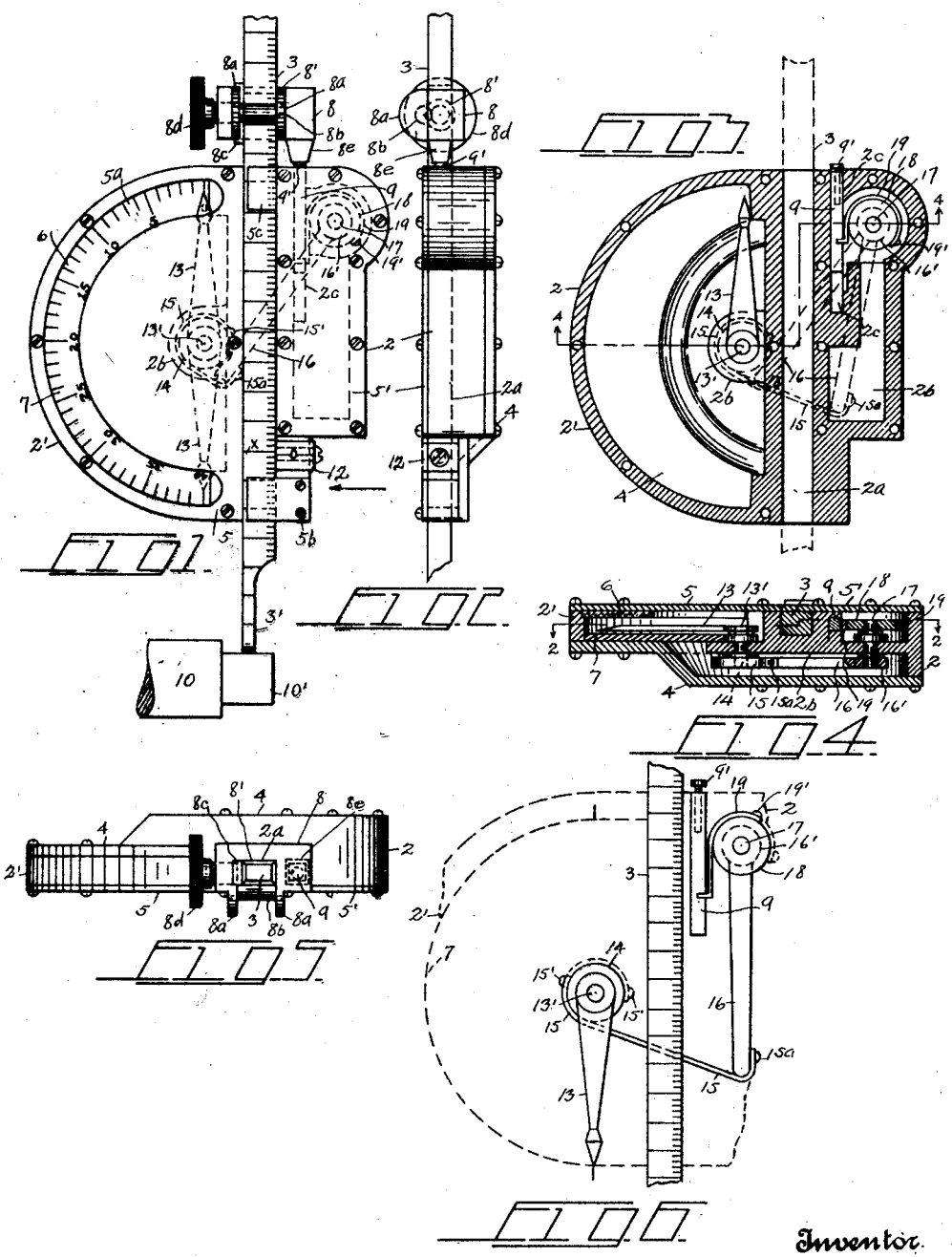
Inventor.
Lino Scusa.
By Harry D. Wallace
Attorney.

Patented Aug. 7, 1928.

1,679,501

UNITED STATES PATENT OFFICE.

LINO SCUSA, OF PHOENIX, NEW YORK.

INDICATOR GAUGE.

Application filed September 29, 1927. Serial No. 222,807.

This invention relates to indicator gauges, designed for use on lathes and other machines, for manual as well as automatic gauging of work, and the invention relates particularly to improvements in the gauges shown and described in my United States Patent No. 1,317,227, dated September 30, 1919.

The object of the present invention is to provide a gauge especially adapted for indicating finish measurements, such as the diameter of a piece of work which is being turned, as well as for gauging lengths and depths of other work. A further object is to provide a gauge having two indicating mediums, one comprising a gravitative scale that takes the place of the common calipers for gauging and indicating the coarser cuts or measurements while the work is in motion, without requiring the stopping of the machines; the other indicating medium comprising an oscillatable needle, which is quiescent during the rough cutting and gauging, and is arranged to indicate the finer final cutting or grinding of the work, the said needle being operated by an extremely sensitive mechanism that is capable of indicating fractional parts of a thousandth of an inch. And a further object is to provide means for readily and positively adjusting the gravitative gauge-member for effecting the oscillation of the needle.

The various features and parts of the invention will be understood from the detailed description which follows, and by reference to the accompanying drawing, in which—

Fig. 1 is a front elevation; Fig. 2 is an edge elevation; Fig. 3 is a section on line 3—3 of Fig. 4; Fig. 4 is a section on line 4—4 of Fig. 3; Fig. 5 is a top plan view, and Fig. 6 is a diagrammatic view of the needle and the compounding means for oscillating the same.

In the drawing, 2 represents a frame having a semicircular portion 2' that is normally open, and a slotted way 2ª to slidably receive and guide a gravitative scale bar or member 3, whose exposed face bears graduations for indicating various measurements. Below the way 2ª the frame is formed with an integral ledge or web 2ᵇ that supports the enclosed mechanism. The bottom of the body is closed by a detachable angular cover 4, while the top, at the opposite sides of the scale 3, is closed by plates 5—5', all of said covers being secured by screws. The cover 5 is formed with a semicircular opening 5ª, which is preferably closed by a transparent member, such as glass or mica, 6, and through which the operator may read indicated measurement or gaugings, by means of a scale 7, the latter being jointly supported by the ledge 2ᵇ and the bottom 4 (see Fig. 4). The scale 3 is held from displacement except longitudinally, in the way 2ª, by a guard plate 5ᵇ, and also by an extension 5ᶜ of the plate 5'. The gravitative movements of the scale 3, may be controlled or limited by a stop, which may be adjustably mounted on the projecting upper end of the scale, the said stop comprising a body 8, which is formed with a slotted way 8' to loosely receive the bar 3, said body having parallel jaws 8ª that extend forwardly beyond the bar, and between which is disposed a rigid guard 8ᵇ, that renders the bar and stop slidable relatively to each other, without danger of accidental detachment of the parts. The slot 8' is preferably broader than the scale 3 and is fitted with a shoe or key 8ᶜ, which may be clamped tightly against the scale for maintaining various adjustments, by means of a screw 8ᵈ. The body of the stop has a depending portion 8ᵉ, that is arranged to engage and depress a plunger 9, which is reciprocable in a socket 2ᶜ of the frame, that parallels the way 2ª.

The lower end of the scale 3 is preferably reduced as at 3', for convenience in gauging closely arranged parts, and when the gauge is employed in connection with a lathe, as shown in my former patent, the said end is brought into engagement with an unturned surface of the work, preparatory to starting the turning work, and remains in contact with the portion of the work that is being turned until the work is finished. The scale 3 is ordinarily freely slidable longitudinally in the way 2ª by gravity, and the depth of the primary or rough cutting by the lathe tool may be determined with more or less accuracy, by the operator noting the registry of a certain graduation on scale 3, to a zero mark borne by a part 12, which is mounted adjacent the way 2ª, as best seen in Fig. 1.

In practice, where duplicate turning work is to be done, the operator first chucks a master part, as 10, in the lathe (not shown) positions the gauge opposite the work, and allows the bar 3 to gravitate in the way 2ª, until its lower end 3' is brought into engagement with a turned-portion, as 10', of the work. He next consults the scale on the bar 3 and ascertains the exact diameter or measurement of said portion, by noting the particular graduation of the bar that registers with the zero mark on the part 12. The stop 8 is next slid along the upper portion of the bar until the member 8$^e$ makes fair contact with, but not heavy enough to depress, the plunger 9. The master-piece is then removed, and a rod or bar from which the duplicate parts are to be made is placed in the lathe, and the scale 3 is again allowed to gravitate until its lower end comes to rest upon the rod. The operator may then proceed with the turning work, which operation may be continuous (without the usual interruptions by stopping the machine and calipering the wrought portions from time to time), until the proper graduation, as $x$, of the scale approaches close to the zero mark on the indicator 12 (see Fig. 1).

When the cutting work has progressed until the graduation $x$ almost alines with the zero mark at 12, the operator readjusts the cutting tool for effecting finer cuts, and continues the latter operation until the exact alinement of said graduation is effected.

Ordinarily, where the turning work is required to be exact at the finish, allowances are made for slight variations or discrepancies, which are usually calculated in thousandths, or fractional parts of a thousandth of an inch. In order to effect such close finish measurements, provision is made whereby the extremely fine final cuttings may be indicated upon the circular scale 7, the latter preferably being arranged with relatively coarse graduations which may be readily seen with the naked eye, and which are preferably exaggerated or enlarged subdivisions denoting thousandths, or fractional parts of a number of thousandths of an inch, as shown in Fig. 1. The readings of the scale 7 are facilitated by a needle or a pointer 13, which is pivoted concentric to scale 7, as at 13', the said needle being arranged to traverse the entire scale, as shown in Figs. 1 and 6. The shaft or spindle 13' may be journaled in the web or ledge 2$^b$, and upon its lower end is mounted a disc 14. The disc 14 is partially rotated by a circumferentially wound strap or belt 15, one end of which is secured to the periphery of the disc, by a fastener 15', the opposite end of the strap 15 being secured to the free end of a lever 16, by a fastener 15$^a$. The other end of the lever 16 comprises a circular perforated head 16', which is rigidly mounted on one end of a spindle or shaft 17, the said shaft also being journaled in the ledge 2$^b$ and its opposite end being fitted with a similar disc 18, which is partially wound with a strap 19 secured by a fastener 19', and the free end of the strap 19 being made fast to the plunger 9, as best seen in Figs. 3 and 6. The straps 15 and 19 are preferably made of thin spring metal, which may be readily wound and unwound for rotating the discs and related parts, the tension of the said straps preferably tending to effect their recoiling and the consequent restoring of needle 13 and lever 16 to the released positions, shown in Figs. 1 and 3, wherein the needle is pointing to the zero mark of the scale 7. The lever 16 and the pointer 13 are of such length that a slight rotary movement of the disc 18, as by the depressing of the plunger 9, moves the pointer 13 reverse clockwise the extent of one or more of the graduated spacings of scale 7, which in practice usually represents thousandths or smaller subdivisions of an inch. For indicating extremely fine finish measurements of a piece of work, the plunger 9 should be so adjusted that, its top end projects but a slight distance above the top surface of the frame 2, as shown in Figs. 1, 2 and 3. This adjustment of the head of the plunger 9 may be varied to suit different kinds of work, and is effected by means of a screw 9', which is threaded into the top end of the plunger, as shown in Figs. 3 and 6.

For ordinary turning work where extreme accuracy is not required, the screw 9' may be so adjusted that its head sinks slightly below the top of the frame 2. This allows the member 8$^e$ to come to rest upon the frame at the instant the graduation $x$, for example, substantially alines with the zero mark at 12, without disturbing the needle 13. But this method of gauging the finish of the work is liable to show several thousandths of an inch discrepancy, in view of the final gauging being effected by the scale 3 alone, without the aid of the compounding mechanism, comprising the lever 16, needle 13, and related parts, as described.

Having thus described my invention, what I claim, is—

1. An indicator gauge comprising a scale, a gravitative scale bar adapted to indicate measurements of a piece of work, means to mount the bar for movement by gravity, a needle to traverse said scale, resilient means connected to said needle for normally holding the needle at zero of said scale, an oscillatable member connected to said resilient means for moving said needle away from zero, and means depressible by the final gravitative movement of the bar for operating said member.

2. An indicator gauge comprising a gravitative scale bar adapted to indicate measurements of a piece of work, means to mount the bar for movement by gravity, means for limiting the gravitative movements of said bar, a circular scale, a needle to traverse said scale, means depressible by the final gravitative movement of said bar for operating the needle during the indicating intervals, and resilient means interposed between said depressible means and the needle and connected to each for normally holding the needle at zero on said scale.

3. An indicator gauge comprising a gravitative scale bar adapted to indicate measurements of a piece of work, means to mount the bar for movement by gravity, means for limiting the gravitation of said bar, a stationary scale, a needle to traverse said scale, means connected to said needle for normally holding it at zero of said scale, a lever connecting with said means adapted to rotate the needle during the indicating periods, a plunger depressible by the gravitation of said bar, a rotary support for said lever, and means connecting said plunger with said support.

4. In an indicator gauge, a gravitative graduated bar and a stationary scale, means to mount the bar for movement by gravity, a needle to traverse the said scale and indicate fine finish measurements of the work, a lever, a rotatable member supporting said lever, a similar member supporting said needle, and a strap coiled around each of said members, and one of which straps is connected to the lever, and means to which the other strap is connected and operable by the bar for causing said straps to be unwound by the gravitation of said bar for rotating said members, said straps adapted to recoil by their own resilience for reversing said members when the pressure of said bar is relaxed.

5. In an indicator gauge, the combination with a gravitative scale bar and a stationary scale of a needle adapted to traverse said scale for indicating finish measurements, means to mount the bar for movement by gravity, a lever, a rotatable member supporting said lever, a similar member supporting said needle, straps for rotating said members in one direction by the gravitation of said bar, one of said straps being connected to the lever, said straps adapted to reverse said members when the pressure of said bar is relaxed, and means to actuate said first named member by the bar so as to enable said bar to gauge the work without disturbing the rotatable members.

6. In an indicator gauge, the combination with a gravitative scale bar adapted for indicating diameters, lengths and depths of the work, and means to mount the bar for movement by gravity, of means for indicating fine finish measurements comprising a needle and a circular scale, a rotor supporting the needle, a resilient strap coiled around said rotor, the tension of said strap tending to hold the needle at the zero mark of said scale, a lever to uncoil said strap connected thereto to move the needle along said scale, a second rotor to oscillate said lever, a resilient strap encircling the latter rotor, and means connected to the last named strap and depressible by the gravitation of said bar for unwinding the last named strap.

7. In an indicator gauge, a gravitative scale bar adapted to engage and measure a piece of work while the latter is in motion, means to mount the bar for movement by gravity, a stationary scale, a needle to indicate the finish measurements of the work on said scale, means operable by the final gravitative movement of the bar for effecting the indicating swing of said needle, said means including a lever and resilient members connected with the opposite ends of said lever for restoring the needle to its inoperative position when said bar is withdrawn from the work.

8. A gauge for indicating rough and finish measurement including a scale, a gravitative scale bar, means to mount the bar for movement by gravity, and an oscillatable needle arranged to traverse said scale, a plunger arranged to be depressed by the final gravitative movement of the bar, a rotatable member, means connecting the member to the plunger so as to rotate the member by the depression of said plunger, a lever oscillated by said member, a similar member supporting said needle, resilient means connecting said lever with the second member whereby when the lever is swung away from the second member the latter moves said needle over said scale, said resilient means adapted to restore the needle, said lever, and said plunger to their inoperative positions when said bar is disengaged from the plunger.

9. An indicator gauge comprising a scale, a gravitative scale bar adapted to indicate rough measurements of a piece of work, means to mount the bar for movement by gravity, a needle to traverse said scale for indicating finish measurements of the work, means depressible by the final gravitative movements of the bar for operating the needle including an oscillatable member, tension means connecting said member with the depressible means, and tension means for operatively connecting said member with the needle, said tension means adapted to normally hold the needle, the depressible means, and said member in the inoperative positions.

10. An indicator gauge comprising a gravitative scale bar adapted to engage and indicate measurements of a piece of work, means to mount the bar for movement by gravity, means for limiting the gravitative movements of said bar, a stationary scale, a needle to traverse said scale, a rotatable support for the needle, a plunger depressible by the gravitation of said bar, a lever operated by said plunger, flexible means operatively connecting said plunger with said lever, and flexible means connecting said lever with said support and cooperating with the first flexible means for normally holding the plunger, the lever, and the needle in the inoperative positions.

11. A gravitative scale bar for indicating primary rough measurements of a piece of work, means to mount the bar for movement by gravity, a needle to indicate finish measurements, said needle being quiescent during the primary measuring, an oscillatable lever, a resilient strap operatively connecting said lever with said needle, said strap tending to normally hold the needle and said lever in the released positions, a stop carried by said bar, a plunger depressible by said stop, and a second strap operatively connecting said plunger with said lever adapted to swing said lever in the direction for uncoiling the first strap and effecting the indicating movements of the needle.

12. In an indicator, a scale, a needle movable over the scale, a scale bar, means to mount the bar for movement by gravity, a slidable plunger engageable with the bar so as to be depressed thereby, and a tensioning device connected to the needle and to the plunger whereby to operate the needle upon depression of the bar and to restore the needle to zero upon disengagement of the bar from the plunger.

13. In an indicator, a scale, a needle movable over the scale, a scale bar, means to mount the bar for movement by gravity, means operable by the bar to actuate the needle, and unitary means connected to said actuating means and to the needle for operating the latter and for restoring the needle to zero upon disengagement of the bar from said actuating means.

14. In an indicator, a scale, a needle movable over the scale, a scale bar, means to mount the bar for movement by gravity, means operable by the bar to actuate the needle operating means, means connected to the needle and to said operating means, and means to connect said operating means to the actuating means whereby upon operating of the actuating means by the bar the needle will be operated.

In testimony whereof I affix my signature.

LINO SCUSA.